(12) United States Patent
Kumar et al.

(10) Patent No.: US 7,914,294 B2
(45) Date of Patent: Mar. 29, 2011

(54) FLEXIBLE ELECTRIC BUS BAR IN A SMALL SPACE

(75) Inventors: Vinod Kumar, Pittsford, NY (US); Andrew Gutierrez Alarcon, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 12/174,116

(22) Filed: Jul. 16, 2008

(65) Prior Publication Data

US 2010/0012345 A1    Jan. 21, 2010

(51) Int. Cl.
*H01R 12/00* (2006.01)
(52) U.S. Cl. .......................................... 439/66; 439/788
(58) Field of Classification Search ............... 439/66, 439/884–889, 212–215
See application file for complete search history.

(56) References Cited

U.S. PATENT DOCUMENTS

| 5,297,967 | A  | * | 3/1994 | Baumberger et al. | 439/66 |
| 6,083,059 | A  | * | 7/2000 | Kuan | 439/862 |
| 6,793,544 | B2 | * | 9/2004 | Brady et al. | 439/886 |
| 7,344,423 | B2 | * | 3/2008 | Sato et al. | 439/884 |

FOREIGN PATENT DOCUMENTS

FR    200593306 A * 4/2005

* cited by examiner

*Primary Examiner* — Briggitte R Hammond
(74) *Attorney, Agent, or Firm* — Fraser Clemens Martin & Miller LLC; J. Douglas Miller

(57) ABSTRACT

An electrical connector having a pair of spaced apart contact portions and a substantially helical resilient portion extending therebetween. The electrical connector for use in a compact space, the electrical connector being flexible and inexpensive, and well suited for use in a vehicle fuel cell electrical system is disclosed.

10 Claims, 3 Drawing Sheets

FLEXIBLE ELECTRIC BUS BAR IN A SMALL SPACE

FIELD OF THE INVENTION

The invention relates to electrical connectors and more particularly to a flexible electric bus bar.

BACKGROUND OF THE INVENTION

Fuel cells have been proposed as an alternative clean and efficient electrical power source. Particularly, fuel cells can be used to power vehicles instead of using traditional power generation methods, such as internal combustion engines. Generally, a single fuel cell cannot generate a substantial amount of power. Fuel cells are arranged in stacks to supply the needed energy requirements for a vehicle.

A proton exchange membrane fuel cell is a type of fuel cell consisting of an anode, a cathode, and an electrolyte membrane. The electrolyte membrane is disposed between the cathode and the anode. Diffusion layers may be disposed adjacent the anode and cathode for distributing reactants such as hydrogen gas and air. An electrochemical reaction within the fuel cell produces water as a reaction product. The water is absorbed by the electrolyte membrane in each fuel cell during operation, causing the overall length of the fuel cell stack to vary in some stack designs.

Electrical connections at either end of a fuel cell stack must accommodate the varying length of the fuel cell stack. This must be done while maintaining strict space requirements, keeping cost low to manufacturers, and maintaining the ability to carry high currents. Prior attempts to maintain these parameters have been accomplished by using sliding joints, flexible braided connectors, and cantilever style bus bars.

Sliding joint connectors, commonly known as fork plugs, have a blade and a fork that allow for a small amount of movement while maintaining an electrical contact between the blade and the fork. Despite a rather compact size, the sliding joint connectors have proved a restrictive option for electrical connections at the end of a fuel cell stack due to a high cost, space requirements, and limited range of movement. Accordingly, sliding joint connectors are not a suitable choice for vehicle manufacturers.

Flexible braided connectors have also failed as a practical means to meet the needs of vehicle manufacturers. The braided connectors contain air space in the braids and do not maintain the space efficiency of a solid connector. Despite a capability of allowing sufficient movement of a fuel cell stack, braided connectors have proven too expensive to be feasible, while additionally failing to fall within the stringent space requirements.

As a third option, cantilever style bus bars are an inadequate option as well. The cantilever style bus bars maintain electrical contact by a biasing force within the connector. While a cost effective option, the cantilever style bus bars require a large space to accommodate the varying length of a fuel cell stack, limiting the use thereof in vehicle applications.

It would be desirable to provide a cost effective flexible electrical connector that allows for sufficient movement between two points in an electrical system while maintaining strict space requirements.

SUMMARY OF THE INVENTION

Presently provided by the invention, a cost effective flexible electrical connector that allows for sufficient movement between two points in an electrical system while maintaining strict space requirements, has surprisingly been discovered.

In one embodiment, the electrical connector comprises a first contact portion, a second contact portion spaced from the first contact portion, and a resilient portion extending between the first contact portion and the second contact portion, the resilient portion adapted to facilitate relative movement between the first contact portion and the second contact portion.

In another embodiment, the electrical connector comprises a plurality of conductors having a first contact portion, a second contact portion spaced from the first contact portion, and a resilient portion extending between the first contact portion and the second contact portion, the resilient portion adapted to facilitate relative movement between the first contact portion and the second contact portion, and an insulator disposed between the conductors.

The invention also provides an electrical system for a fuel cell stack.

In one embodiment, the electrical system for a fuel cell stack comprises an interface unit, a fuel cell stack, and an electrical connector coupled to the interface unit and the fuel cell stack, including a first contact portion, a second contact portion spaced from the first contact portion, a resilient portion extending between the first contact portion and the second contact portion, the resilient portion adapted to facilitate relative movement between the first contact portion and the second contact portion.

The flexible electrical connector provided by the present invention is specifically advantageous for providing a cost effective option to vehicle manufacturers, in a compact space, that allows for sufficient movement between two points in an electrical system.

BRIEF DESCRIPTION OF THE DRAWINGS

The above, as well as other advantages of the present invention, will become readily apparent to those skilled in the art from the following detailed description of embodiments of the invention when considered in the light of the accompanying drawings in which.

DETAILED DESCRIPTION OF EXEMPLARY EMBODIMENTS OF THE INVENTION

The following detailed description and appended drawings describe and illustrate an embodiment of the invention. The description and drawings serve to enable one skilled in the art to make and use the invention, and are not intended to limit the scope of the invention in any manner.

Figure 1:
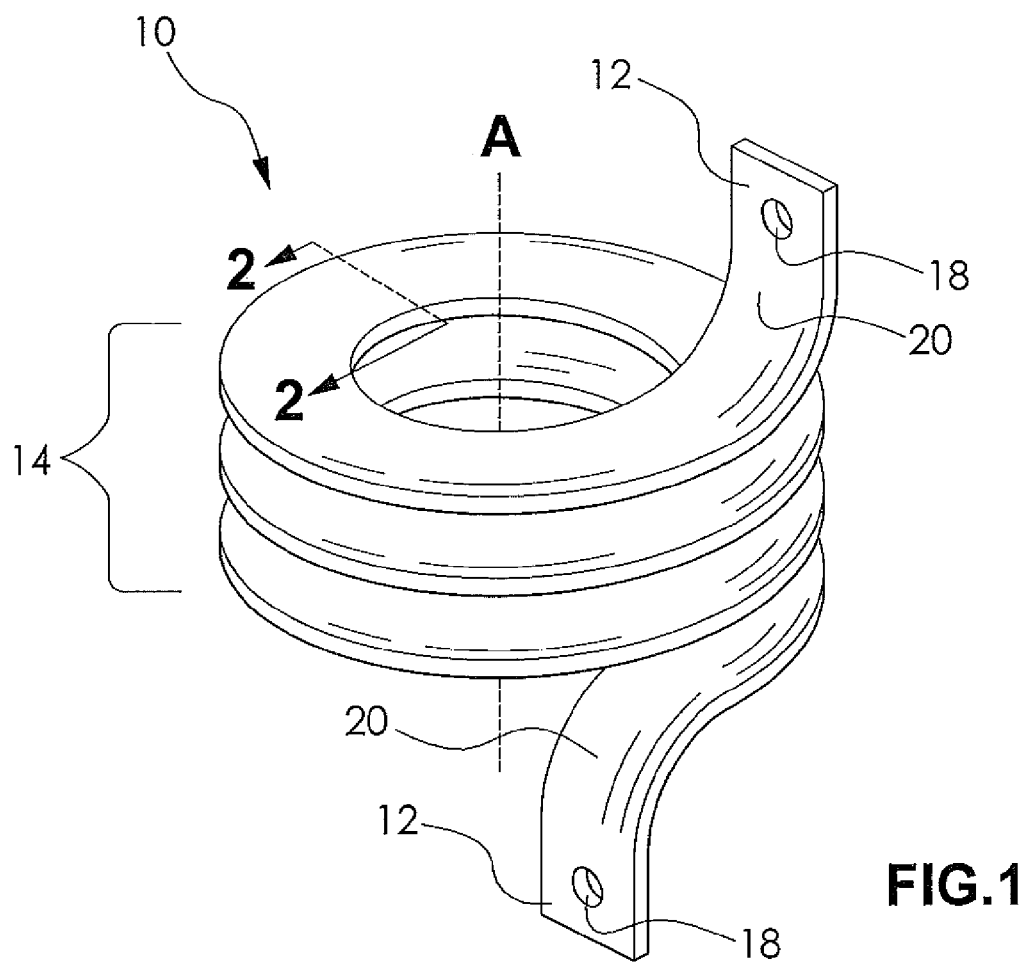
FIG. 1 is a perspective view of a flexible electrical connector according to an embodiment of the present invention.

Referring to FIG. 1, there is illustrated an electrical connector 10 in accord with the present invention. The electrical connector 10 includes contact portions 12 and a resilient portion 14. The electrical connector 10 is formed from an electrically conductive material such as copper or aluminum, for example. Other materials may be employed as desired. In certain embodiments, the electrical connector 10 may be formed by stamping a length of metal having a rectangular cross-sectional shape from a blank and bending the length of metal into the illustrated shape. It is understood that the electrical connector 10 may be formed by other methods. It is further understood that the electrical connector 10 may have other cross-sectional shapes, as desired. As shown, the resilient portion 14 extends between the contact portions 12, herein the components may share a uniform solid cross section. In the embodiment shown, the resilient portion 14 has a substantially helical shape. However, other shapes providing a longitudinal axial flexibility can be used such as a rectangular stepped shape, for example. The cross section of one or both of the contact portions 12 and the resilient portion 14 may be rectangular in shape. However, it is understood that the contact portions 12 and the resilient portion 14 may have different shapes, as desired.

Figure 2:
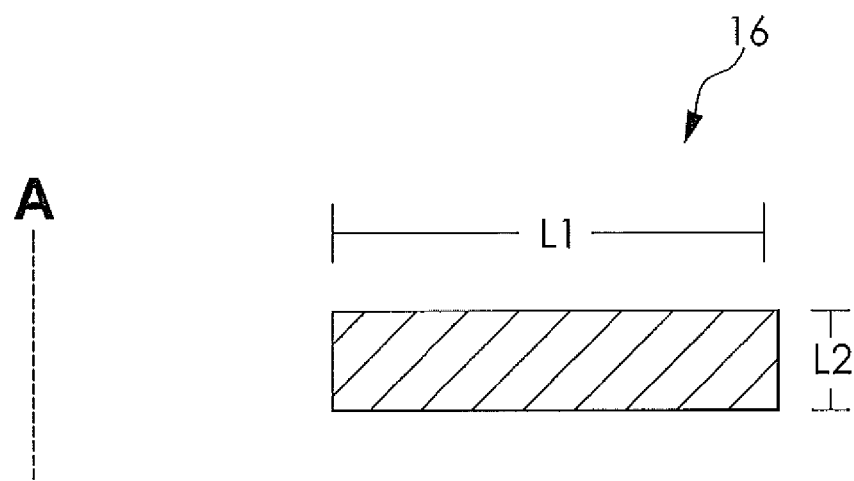
FIG. 2 is a cross-sectional view of the flexible electrical connector illustrated in FIG. 1 taken along line 2-2.

As illustrated in FIG. 2, a rectangular cross section 16 of the electrical connector, has a first length L1 perpendicular to a longitudinal axis A of the resilient portion 14, and a second length L2 parallel to the longitudinal axis A of the resilient portion 14. Preferably, the first length L1 is greater than the second length L2, affording flexibility along the longitudinal axis A of the resilient portion 14. As a ratio of the first length L1 to the second length L2 increases, the amount of axial flexibility increases per turn of the resilient portion 14. As a non limiting example, a ratio of two may produce an axial flexibility of three millimeters per turn whereas a ratio of three may produce an axial flexibility of four millimeters per turn. Additionally, it is widely known that the cross-sectional area of a conductor is directly related to the amount of current a conductor is capable of carrying. These, as well as other characteristics, may be varied to create an electrical connector 10 of a desired length and flexibility to suit the particular need desired.

The contact portions 12 of the electrical connector are shown in FIG. 1 as being substantially parallel to the longitudinal axis A of the resilient portion 14. This facilitates use of various options for connectivity by leaving the space surrounding the contact portions 12 significantly open. Other arrangements of the contact portions 12 may be employed, such as the contact portions 12 being substantially perpendicular to the longitudinal axis A of the resilient portion 14. Additionally, the contact portions 12 may be positioned at any angle between the parallel and perpendicular arrangements, adapted for a particular need. The contact portions 12 may include an aperture 18, adapted to receive a fastener 19 (shown in FIG. 4) for coupling of the connector 10 to an electrical system. Other features may be incorporated into the contact portions 12 such as a tab or a protuberance, to facilitate a sufficient electrical connection or adequate coupling of the electrical connector 10.

The resilient portion 14 of the electrical connector 10 is shown as following a substantially annular path along an axis, but other shapes may be employed to the same effect. An elliptical, rectangular, or polygonal path may be used, for example. The resilient portion 14 may also utilize a non-linear axis if so desired. In certain embodiments, a curved axis or an axis having multiple linear sections may be incorporated depending upon a desired geometry for the electrical connector 10. As illustrated, the resilient portion 14 includes three turns. However, it is understood that any number of turns, including a fractional amount may be used to create the desired resilient portion 14.

In one embodiment, a connecting portion 20 is disposed between the contact portion 12 and the resilient portion 14. As shown, the connecting portion 20 is arcuate, thereby enabling a smooth transition between the contact portion 12 and the resilient portion 14. The connecting portion 20 shares a uniform solid cross-sectional shape with the contact portion 12 and the resilient portion 14. The connecting portion 20 militates against shear stress concentration that may be evident where the transition between the contact portion 12 and the resilient portion 14 is abrupt. Additionally, fatigue of the electrical connector 10 may be minimized when the connecting portion 20 is present, thereby maximizing a life of the connector 10.

In use, the electrical connector 10 is coupled to at least one movable component of an electrical system. When one of the components moves, the electrical connector 10 may compress the electrical connector 10 axially, extend it axially, or deflect the axis of the resilient portion 14. As noted, the connector 10 may be used for automotive applications requiring a connector capable of carrying high currents in a compact space, at a low cost. For example, when the electrical connector 10 is used as a connector for a fuel cell stack, connectors 10 may exist between a fuel cell stack and a fixed stack interface unit, between two separate stacks, between two separate batteries, or between a battery terminal and distribution block. The same benefits are evident when the connector 10 is used in non-automotive applications.

It is widely know that an inductive force results from the application of a current to a substantially helical conductor. When a current is applied to the electrical connector 10, the electrical connector 10 becomes an inductor, resisting full current on initial application and militating against an instant restraint on current when stopped. Where the resulting inductance created by the connector 10 may cause difficulties, the invention may be adapted to minimize inductance by creating a substantially equal and opposing inductance.

Figure 3:
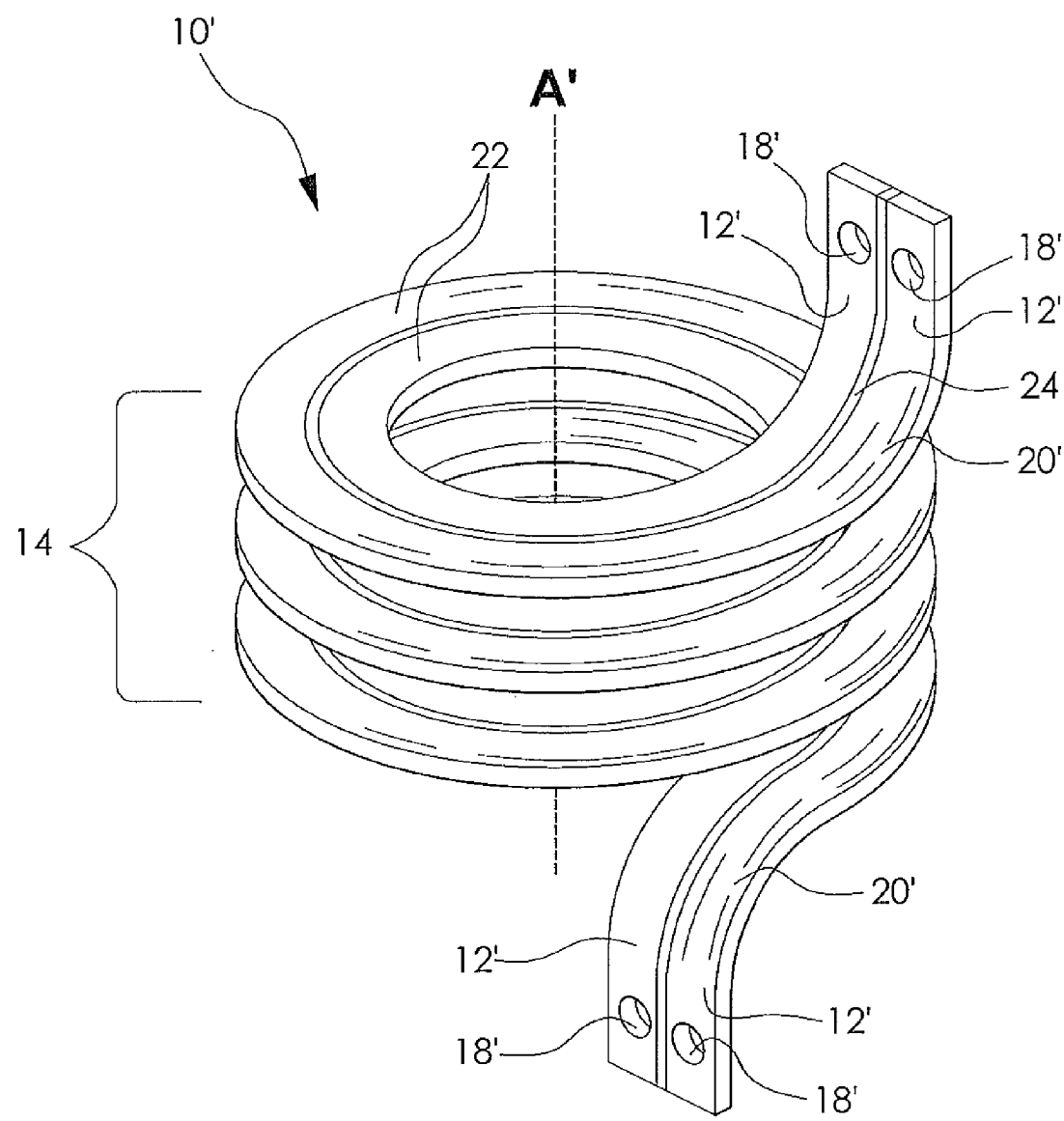
FIG. 3 is a perspective view of a flexible electrical connector according to another embodiment of the invention.

FIG. 3 shows another embodiment of the invention similar to that shown in FIG. 1. Reference numerals for similar structure in respect of the description of FIG. 1 are repeated in FIG. 3 with a prime (') symbol.

Two conductors 22 form each of the contact portions 12', the resilient portion 14', and the connecting portion 20' in FIG. 3. However, it is understood any number of conductors 22 may be used. A resilient insulating material 24 such as plastic is disposed between the conductors 22. This arrangement allows a plurality of currents to be carried by the connector. The currents may be in opposing directions and generating opposing inductive forces. When the opposing currents are of substantially the same magnitude, the resulting inductive forces will be of substantially the same magnitude as well. This results in a net inductive force that is insignificant, allowing the connector 10' to be used without concern of having difficulties related to inductive forces that may be generated. As illustrated, apertures 18' may be included in the contact portions 12' of each of the conductors 22.

Figure 4:
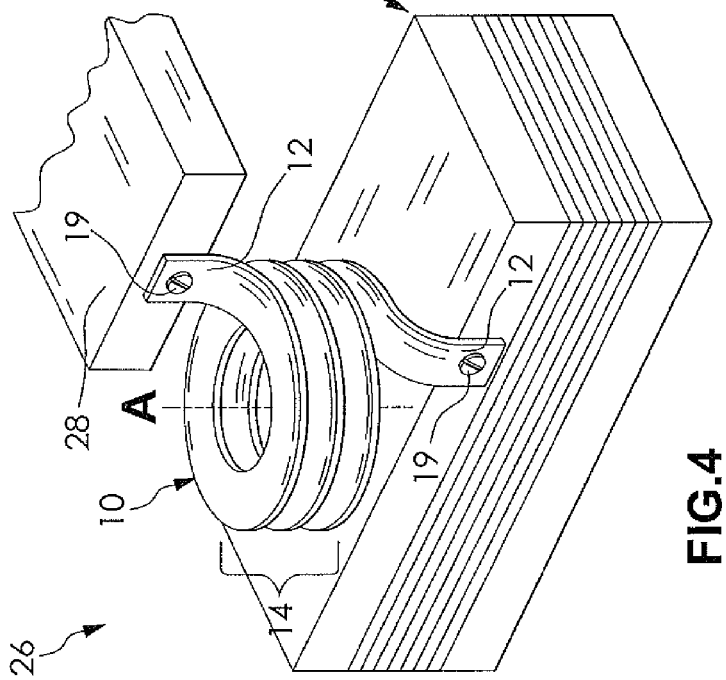
FIG. 4 is a perspective view of an electrical system for a fuel cell stack including the flexible electrical connector of FIG. 1.

Electrical systems incorporating the electrical connector are provided by the invention. FIG. 4 illustrates an electrical system 26 including an interface unit 28, a fuel cell stack 30, and the electrical connector 10.

The stack interface unit 28 may be of a general or special type adapted to receive at least one electrical connection and convey a current. As shown, the stack interface unit 28 is coupled to the electrical connector 10 by a fastener 19 extending through the aperture 18 in the electrical contact portions 12. Other means, such as a self engaging protuberance or a clamp type connection can be used as desired. The stack interface unit 28 is typically attached to a system separate from the fuel cell stack 30. For example, the stack interface unit 28 may be attached to a vehicle chassis or other fixed component, for example. Additionally, the stack interface unit 28 may be attached to a rigid structure of a power generating system.

The fuel cell stack 30 includes a plurality of individual fuel cells for generating electric power. As membranes included between the individual fuel cells of the fuel cell stack 30 expand and contract during normal operation, a height of the stack 30 will vary. An end of the fuel cell stack 30 may be coupled to the electrical connector 10 directly, through the use of a special plate, or a specialized connector. The fuel cell stack 30 is fixedly attached to a vehicle or rigid structure at one end, limiting the expansion and contraction to one end of the fuel cell stack 30. When the stack 30 is fixed at one end, the electrical connector 10 is to be coupled to the opposing end. Other arrangements may also be employed, such as affixing the fuel cell stack 30 at an intermediate point, allowing expansion and contraction to occur at both ends. As shown, the fuel cell stack 30 is coupled to the electrical connector 10 by a fastener 19 extending through the aperture 18 in the electrical connector 10. Other means, such as a self engaging protuberance or a clamp type connection could be used as desired.

Figure 5:
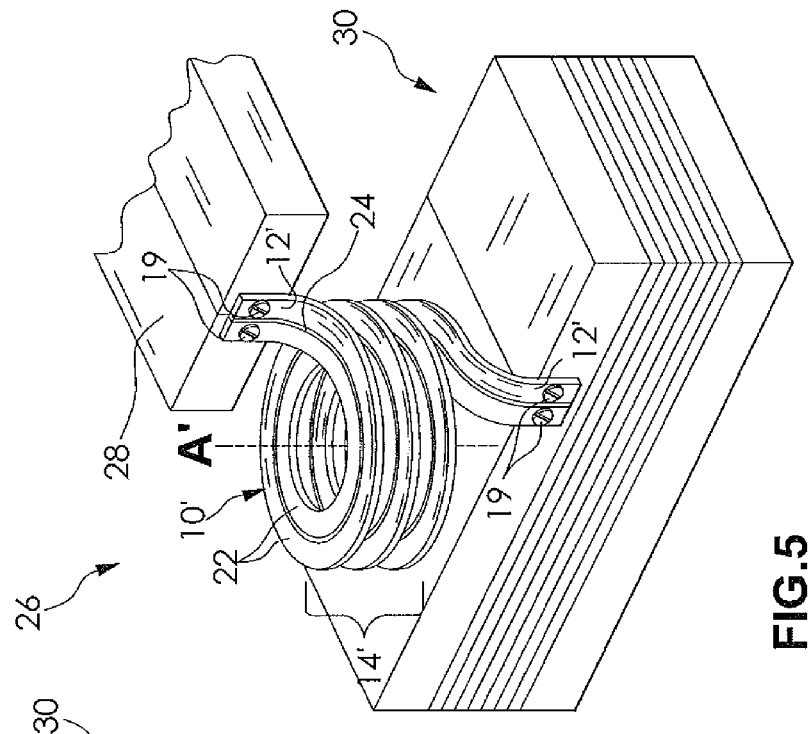
FIG. 5 is a perspective view of an electrical system for a fuel cell stack including the flexible electrical connector of FIG. 3.

FIG. 5 shows another embodiment of the invention similar to that shown in FIG. 4. Reference numerals for similar structure in respect of the description of FIG. 4 are repeated in FIG. 5 with a prime (') symbol.

FIG. 5 shows the electrical connector 10' incorporated into an electrical system 26', where the electrical connector 10' comprises a plurality of conductors 22 having an insulator 24 disposed therebetween. The stack interface unit 28' and fuel cell stack 30' may be adapted for use with an electrical connector 10' having a plurality of conductors.

From the foregoing description, one ordinarily skilled in the art can easily ascertain the essential characteristics of this invention and, without departing from the spirit and scope thereof, make various changes and modifications to the invention to adapt it to various usages and conditions.

We claim:

1. An electrical system for a fuel cell stack, the electrical system comprising:
    an interface unit;
    a fuel cell stack; and
    an electrical connector coupled to the interface unit and the fuel cell stack, including a first contact portion, a second contact portion spaced from the first contact portion, a resilient portion extending between the first contact portion and the second contact portion, the resilient portion having a substantially helical shape, the resilient portion adapted to facilitate relative movement between the first contact portion and the second contact portion,
    wherein the electrical connector is formed by a pair of conductors having a first contact portion, a second contact portion spaced from the first contact portion, and a resilient portion extending between the first contact portion and the second contact portion, the first contact portions of the conductors forming the first contact portion of the electrical connector, the second contact portions of the conductors forming the second contact portion of the electrical connector, and the resilient portions of the conductors forming the resilient portion of the electrical connector,
    wherein an insulator is disposed between and insulates the conductors, and wherein the insulator includes a first portion abutting the first contact portions of the pair of conductors, a second portion abutting the second contact portions of the pair of conductors, and a third portion extending between the first portion and the second portion of the insulator, the third portion having a substantially helical shape and abutting the resilient portions of the pair of conductors.

2. The electrical system for a fuel cell stack according to claim 1, wherein each of the first contact portions of the conductors and the second contact portions of the conductors has an aperture formed therein.

3. An electrical connector comprising:
    a pair of conductors, each of the conductors having a first contact portion, a second contact portion spaced from the first contact portion, and a resilient portion having a substantially helical shape and extending between the first contact portion and the second contact portion; and
    an insulator disposed between and insulating the conductors, wherein the insulator includes a first portion abutting the first contact portions of the pair of conductors, a second portion abutting the second contact portions of the pair of conductors, and a third portion extending between the first portion and the second portion of the insulator, the third portion having a substantially helical shape and abutting the resilient portions of the pair of conductors.

4. The electrical connector according to claim 3, wherein each of the first contact portion and the second contact portion has an aperture formed therein.

5. The electrical connector according to claim 3, wherein the electrical connector is formed from one of copper and aluminium.

6. The electrical connector according to claim 3, wherein the electrical connector is produced by stamping and bending sheet metal.

7. The electrical connector according to claim 3, wherein the first contact portion, the second contact portion, and the resilient portion have a substantially uniform cross-sectional shape.

8. The electrical connector according to claim 7, wherein the cross-sectional shape has a first length substantially perpendicular to a longitudinal axis of the resilient portion, and a second length substantially parallel to the longitudinal axis of the resilient portion, the first length greater than the second length.

9. The electrical connector according to claim 3, wherein a connecting portion is disposed between the contact portion and the resilient portion.

10. The electrical connector according to claim 9, wherein the connecting portion is arcuate thereby positioning the contact portion substantially perpendicular to the resilient portion.

* * * * *